United States Patent
Guillez et al.

(10) Patent No.: US 6,572,145 B1
(45) Date of Patent: Jun. 3, 2003

(54) ROLLBAR FOR CONVERTIBLE VEHICLE WITH FOLDING ROOF

(75) Inventors: Jean-Marc Guillez, Cerizay (FR); Paul Queveau, Cerizay (FR); Gerard Queveau, Cerizay (FR)

(73) Assignee: Societe Europeenne de Brevets Automobiles (FR)

( * ) Notice: Subject to any disclaimer, the term of this patent is extended or adjusted under 35 U.S.C. 154(b) by 0 days.

(21) Appl. No.: 09/936,123

(22) PCT Filed: Mar. 16, 2000

(86) PCT No.: PCT/FR00/00647

§ 371 (c)(1),
(2), (4) Date: Feb. 11, 2002

(87) PCT Pub. No.: WO00/55015

PCT Pub. Date: Sep. 21, 2000

(30) Foreign Application Priority Data

Mar. 16, 1999 (FR) .............................................. 99 03244

(51) Int. Cl.[7] .............................................. B60R 21/13
(52) U.S. Cl. ........................ 280/756; 280/751; 280/753
(58) Field of Search ................................ 280/756, 753, 280/751; 296/107.01, 107.09

(56) References Cited

U.S. PATENT DOCUMENTS

| | | | | |
|---|---|---|---|---|
| 4,557,502 A | * | 12/1985 | Scaduto et al. | 280/756 |
| 4,830,402 A | * | 5/1989 | Matthias et al. | 280/756 |
| 5,056,816 A | * | 10/1991 | Lutze et al. | 280/751 |
| 5,094,478 A | * | 3/1992 | Pfanzeder et al. | 280/756 |
| 5,205,585 A | * | 4/1993 | Reuber et al. | 280/753 |
| 5,224,735 A | * | 7/1993 | Jambor et al. | 280/756 |
| 5,236,219 A | * | 8/1993 | Jambor et al. | 280/756 |
| 5,284,360 A | * | 2/1994 | Busch et al. | 280/756 |
| 5,622,382 A | * | 4/1997 | Zepnik et al. | 280/756 |
| 5,641,193 A | * | 6/1997 | Zepnik et al. | 280/756 |
| 5,890,738 A | * | 4/1999 | Heiner et al. | 267/292 |
| 6,386,585 B1 | * | 5/2002 | Muller et al. | 280/756 |
| 6,443,517 B1 | * | 9/2002 | Just et al. | 280/756 |

FOREIGN PATENT DOCUMENTS

| | | | |
|---|---|---|---|
| DE | 1555955 | | 10/1970 |
| EP | 459213 A1 | * | 12/1991 |
| EP | 0411449 | | 2/1992 |
| EP | 0504482 | | 9/1992 |
| JP | 04310448 A | * | 11/1992 |
| JP | 05213130 A | * | 8/1993 |
| WO | WO91/02669 | | 3/1991 |

* cited by examiner

Primary Examiner—Paul N. Dickson
Assistant Examiner—Deanna Draper
(74) Attorney, Agent, or Firm—Bachman & LaPointe, P.C.

(57) ABSTRACT

The invention concerns a rollbar integral with the vehicle body and mobile between a retracted position and a position wherein, when the roof is open, the rollbar projects sufficiently above the vehicle back shelf to protect the passengers in case the vehicle overturns. The rollbar consists of two rollbar elements mutually articulated at the top of the rollbar, the lower ends of each rollbar element capable of sliding along a straight line parallel to the vehicle back shelf and located beneath the shelf.

8 Claims, 3 Drawing Sheets

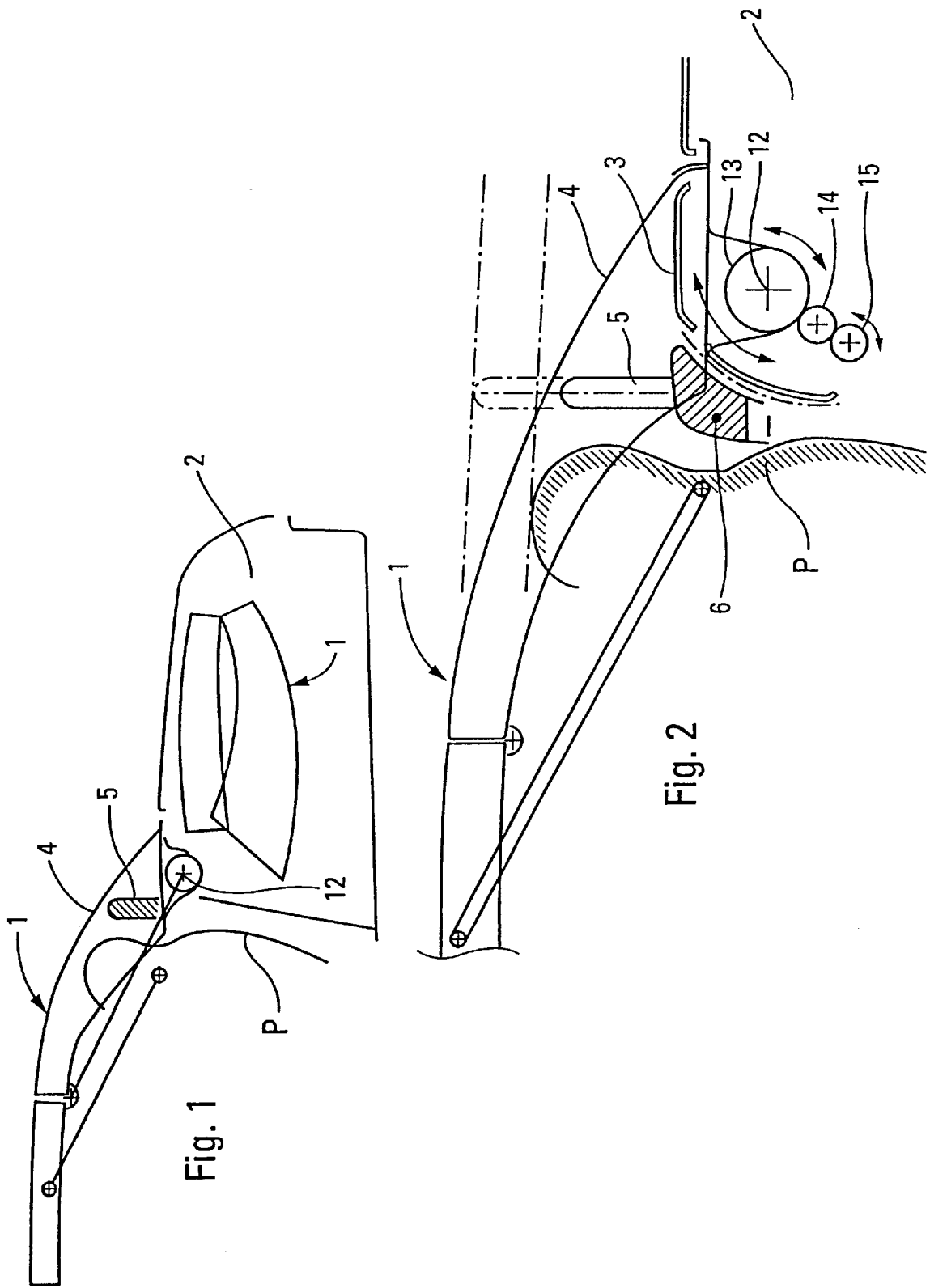

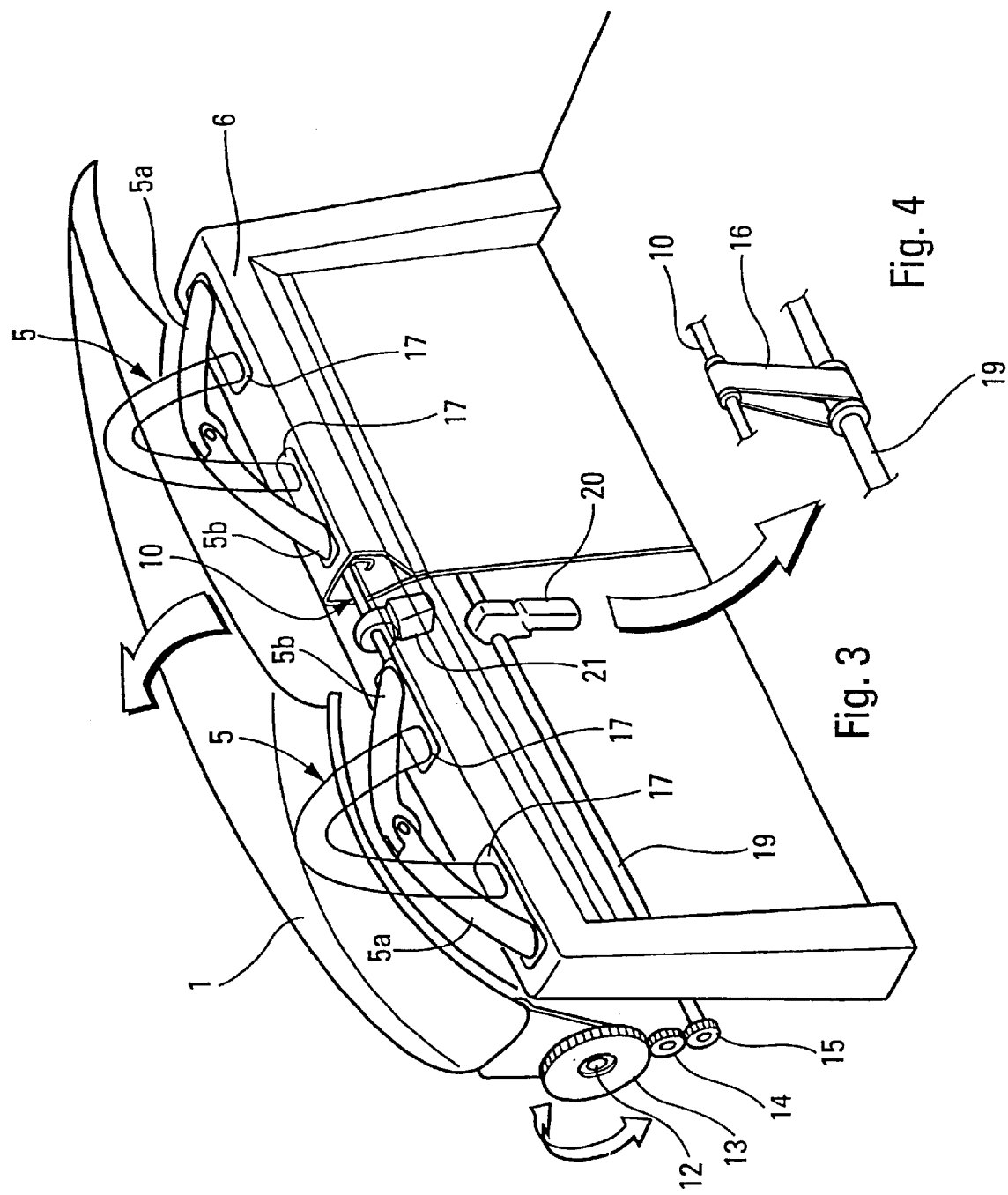

ROLLBAR FOR CONVERTIBLE VEHICLE WITH FOLDING ROOF

The present invention concerns a rollbar for convertible vehicle with folding roof to protect the passengers in case the vehicle overturns.

There are known convertible vehicles having a protective rollbar integral with the vehicle body and moveable between a retracted position compatible with a folding roof set on the vehicle and a position in which, when the roof is open, the rollbar projects sufficiently above the vehicle back shelf to protect the passengers in case the vehicle overturns.

To optimize the vehicle functionality, especially for a very short vehicle, the rear passenger has to be seated as far behind as he can and the folded roof be put forward in the trunk as far as it is possible. These two requirements in combination with the inclination of the roof and the forwardly rotation of the back shelf restrict the rollbar attachment to a zone which is located in front of the package shelf.

This rollbar is bounded by the roof when the latter is closed, and must raise to a position located above the passenger heads when the roof is folded in the rear trunk so as to protect adequately the passengers in case the vehicle overturns.

Moreover, the zone where the rollbar is attached has to be connected to the vehicle frame, on a side part, in order to provide a rigid connection between the rollbar and this frame.

One aim of the present invention is to provide a protective rollbar which attains the above objectives.

According to the invention, this protective rollbar is characterized in that the rollbar consists of two rollbar elements mutually articulated at the top of the rollbar, the lower ends of each rollbar element being capable of sliding along a straight line parallel to the vehicle back shelf and located beneath said shelf, between a first position in which the two lower ends of both rollbar elements are mutually moved away while the articulation is close to said straight line, and a second position in which the two lower ends of both rollbar elements are mutually brought closer while the articulation is moved away from said straight line.

With this arrangement, the rollbar being at the first position, it does not encroach upon the available room in the trunk, nor on the room that could be used between the trunk and the passenger compartment.

Actually, at both positions, the two lower ends of the rollbar are located on a straight line which can be placed in front of a back shelf retractable so as to allow the folded roof to be passed and stored inside the trunk.

Preferably, the protective rollbar consists of two rollbars which are spaced apart and aligned along said straight line.

Also, preferably, each end of one rollbar element is provided with a wheel fitted in a rail extending along said straight line.

According to an advantageous embodiment of the invention, bringing together or moving away the ends of the rollbar elements is controlled by the rotation of one threaded rod which engages the corresponding threadings integral with the ends of the rollbar elements, the thread pitch of the threaded rod being reversed for one threading in comparison with the other.

The rotation of one threaded rod can be controlled by means of a motor or through a pivotal movement of the folding roof between the position in which this roof is set on the vehicle and the position in which the roof is stored inside the vehicle trunk.

Other features and advantages of the invention will be more clearly understood from the description here below.

In the non-limitative exemplary appended drawings:

FIG. 1 is a schematic partial longitudinal cross section view of a convertible vehicle provided with a protective rollbar according to the invention;

FIG. 2 is an enlarged longitudinal cross section view showing in particular both positions of the rollbar;

FIG. 3 is a perspective view showing both rollbars and their control accessories;

FIG. 4 shows a detail in FIG. 3;

Figure 7:
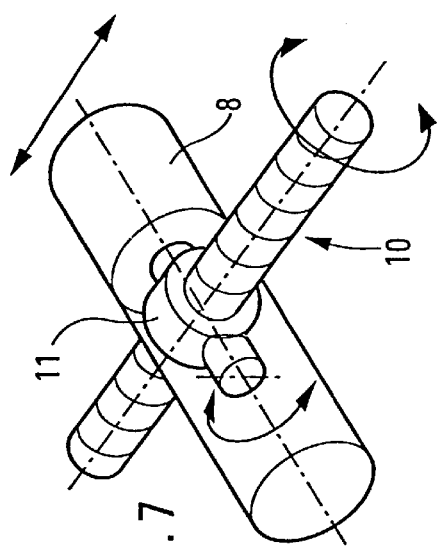
FIG. 7 is a perspective view showing the threaded rod that controls the movement of the ends of both rollbar elements.

FIGS. 1 and 2 show one convertible vehicle with a folding roof 1 which can be stored inside the rear trunk 2 after having tilted forwards the back shelf 3 located beneath the rear window 4 of the roof 1.

In front of this back shelf 3 is located one rollbar 5 integral with a part 6 connected to the frame. This rollbar 5 is moveable between a retracted position compatible with a folding roof 1 set on the vehicle and a position (indicated by a chain line in FIG. 2) in which, when the roof is open, the rollbar projects sufficiently above the vehicle back shelf 3 to protect the passengers P in case the vehicle overturns.

According to the invention, (see FIGS. 3 and 5), the rollbar 5 consists of two rollbar elements 5a mutually articulated at 7 near the top of the rollbar 5.

The lower ends 5b of each rollbar element 5a are capable of sliding along a straight line D parallel to the vehicle back shelf 3 and located beneath this shelf, between a first position in which the two lower ends 5b of the rollbar elements are mutually moved away while the articulation is close to the straight line D, and a second position in which the two lower ends 5b of the rollbar elements are mutually brought closer while the articulation 7 is moved away from the straight line D.

As shown in FIG. 3, the vehicle comprises two rollbars 5 which are spaced apart and aligned along the straight line D.

Figure 6:
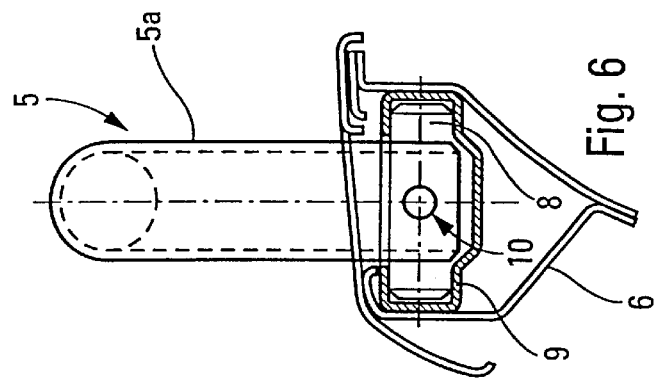
FIG. 6 is a section view taken on plan VI—VI in FIG. 5.
Figure 5:
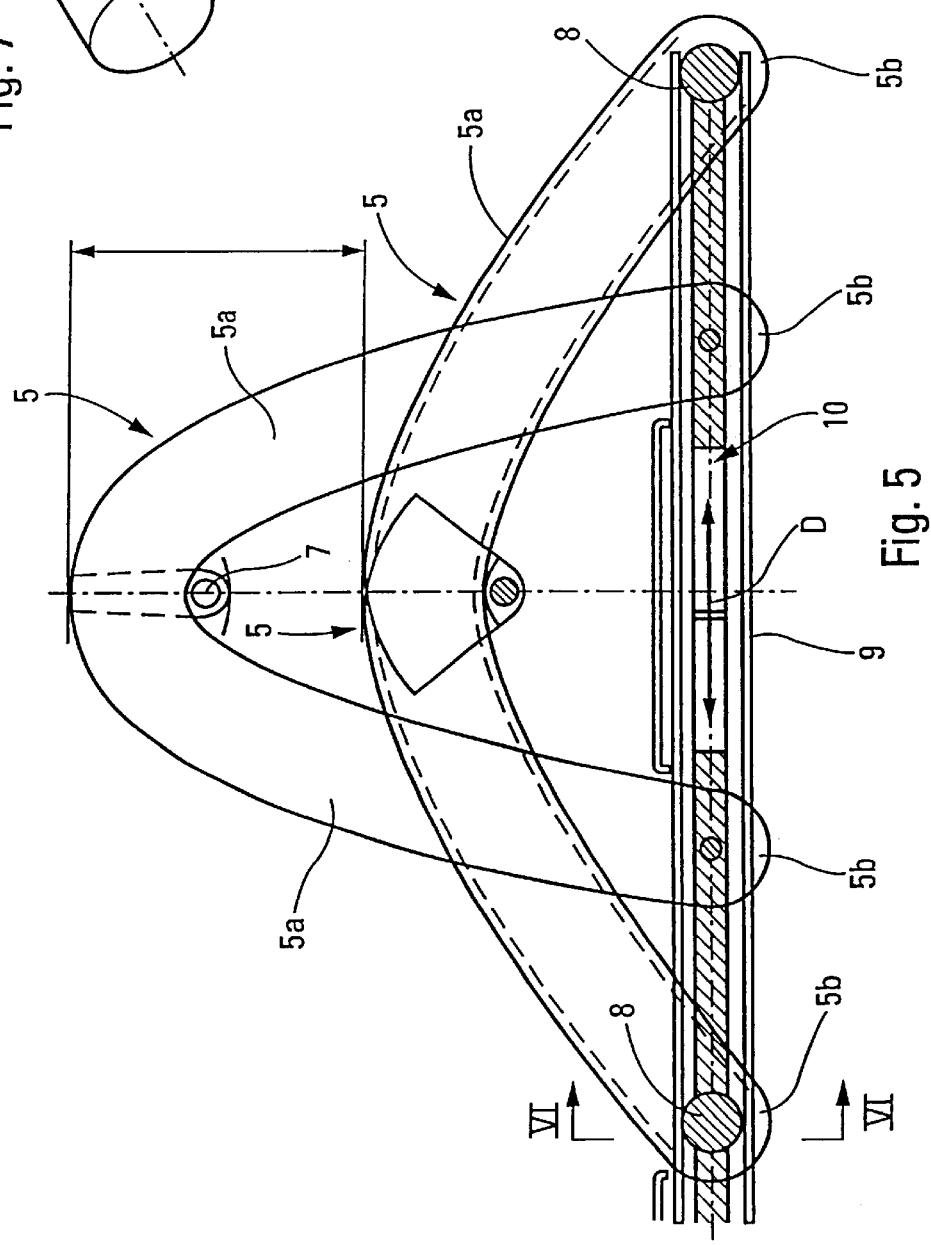
FIG. 5 is a plan view of one rollbar and of the sliding rail.

FIGS. 5 and 6 show each end 5b of one rollbar element 5a being provided with a wheel 8 fitted in a rail 9 extending along the straight line D.

In other respects, bringing together or moving away the ends 5b of the rollbar elements 5a is controlled by the rotation of one threaded rod 10 which engages the corresponding threadings 11 (see FIG. 7) integral with the ends 5b of the rollbar elements 5a.

On the other hand, as shown in FIG. 5, the thread pitch of the threaded rod 10 is reversed for one threading in comparison with the other so as to allow the above mentioned movement for bringing together or moving away the ends 5b of the rollbar elements 5a.

The rotation of the threaded rod 10 can be controlled by means of an electric motor.

The rotation of the threaded rod 10 can equally be controlled through the pivotal movement of the folding roof 1 around the axis 12 (see FIGS. 2 and 3) between the position in which this roof 1 is set on the vehicle and the position in which the roof 1 is stored inside the trunk 2 of the vehicle.

The transmission between the pivotal movement of the folding roof 1 and the rotation of the threaded rod 10 can be effected by means of a series of pinions 13, 14, 15 meshing with one another, and with a toothed belt 16 (see FIG. 4) so as to obtain the appropriate gear ratio.

FIG. 3 further shows that the ends 5b of each rollbar element 5a are engaged with elongated recesses 17 formed in a hollow beam 7 extending in front of the back shelf 3 of the vehicle. Of course, the length of the elongated recesses 17 is sufficient so as to allow the movement of the ends 5b of the rollbar elements 5a between the two positions described hereabove.

The operation of the device having been just described is as follows:

The motor 20 gives rise to the rotation of the toothed pinion 13 connected to the roof 1 through the shaft 19 and both pinions 14 and 15.

The backward rotation of the roof 1 causes the rotation of the threaded rod 10 through the toothed belt 16.

The rotation of the threaded rod causes the translatory motion of the ends 5b of the rollbar elements 5a by means of the threadings 11.

The rollbars 5 move thus between the retracted position and the upright position as shown in FIGS. 2, 3 and 5.

The movement of the rollbars 5 in the opposite direction occurs when the roof is being closed.

The rotation of the roof 1 and that of the threaded rod 10 can be controlled by separate motors 20 and 21. In that case, the connection between the shaft 19 and the threaded rod 10 by means of the toothed belt 16 can be suppressed.

Needless to say, the invention is not restricted to the example just described, and numerous modifications may be made without departing from the scope of the invention.

What is claimed is:

1. A protective rollbar for a convertible vehicle with a folding roof, said rollbar being integral with a body of the vehicle and moveable between a retracted position compatible with said folding roof set on the vehicle and a deployed position in which, when the roof is open, the rollbar projects above a vehicle back shelf to protect passengers in case the vehicle overturns, the rollbar having two rollbar elements mutually articulated at a top of the rollbar, each said rollbar element having a lower end which slides along a straight line parallel to the vehicle back shelf and which is located beneath said shelf, said rollbar being moveable between a first position where the two lower ends of both said rollbar elements are mutually moved away while the articulation is close to said straight line, and a second position where the two lower ends of both said rollbar elements are mutually brought closer while the articulation is moved away from said straight line.

2. A protective rollbar according to claim 1, further comprising two rollbars which are spaced apart and aligned along said straight line.

3. A protective rollbar according to claim 1, wherein each of the lower ends of one rollbar is provided with a wheel fitted in a rail extending along said straight line.

4. A protective rollbar according to claim 1, further comprising a threaded rod for bringing together and moving away the lower ends of the rollbar elements, said threaded rod engaging corresponding threadings integral with the lower ends of the rollbar elements, and said threaded rod having a thread pitch which is reversed for one threading in comparison with another threading.

5. A protective rollbar according to claim 4, further comprising a motor for controlling rotation of the threaded rod.

6. A protective rollbar according to claim 4, further comprising rotation of the threaded rod being controlled through a pivotal movement of the folding roof between a position in which the roof is set on the vehicle and a position in which the roof is stored inside a trunk of the vehicle.

7. A protective rollbar according to claim 6, further comprising a series of pinions meshing with one another for obtaining an appropriate gear ratio and for transmitting the pivotal movement of the folding roof and the rotation of the threaded rod.

8. A protective rollbar according to claim 1, further comprising the lower end of each rollbar element being engaged with elongated recesses formed in a hollow beam extending in front of the back shelf of the vehicle, each of the elongated recesses having a length sufficient to allow the movement of said lower ends of the rollbar elements between said first and second positions.

\* \* \* \* \*